Patented Sept. 30, 1941

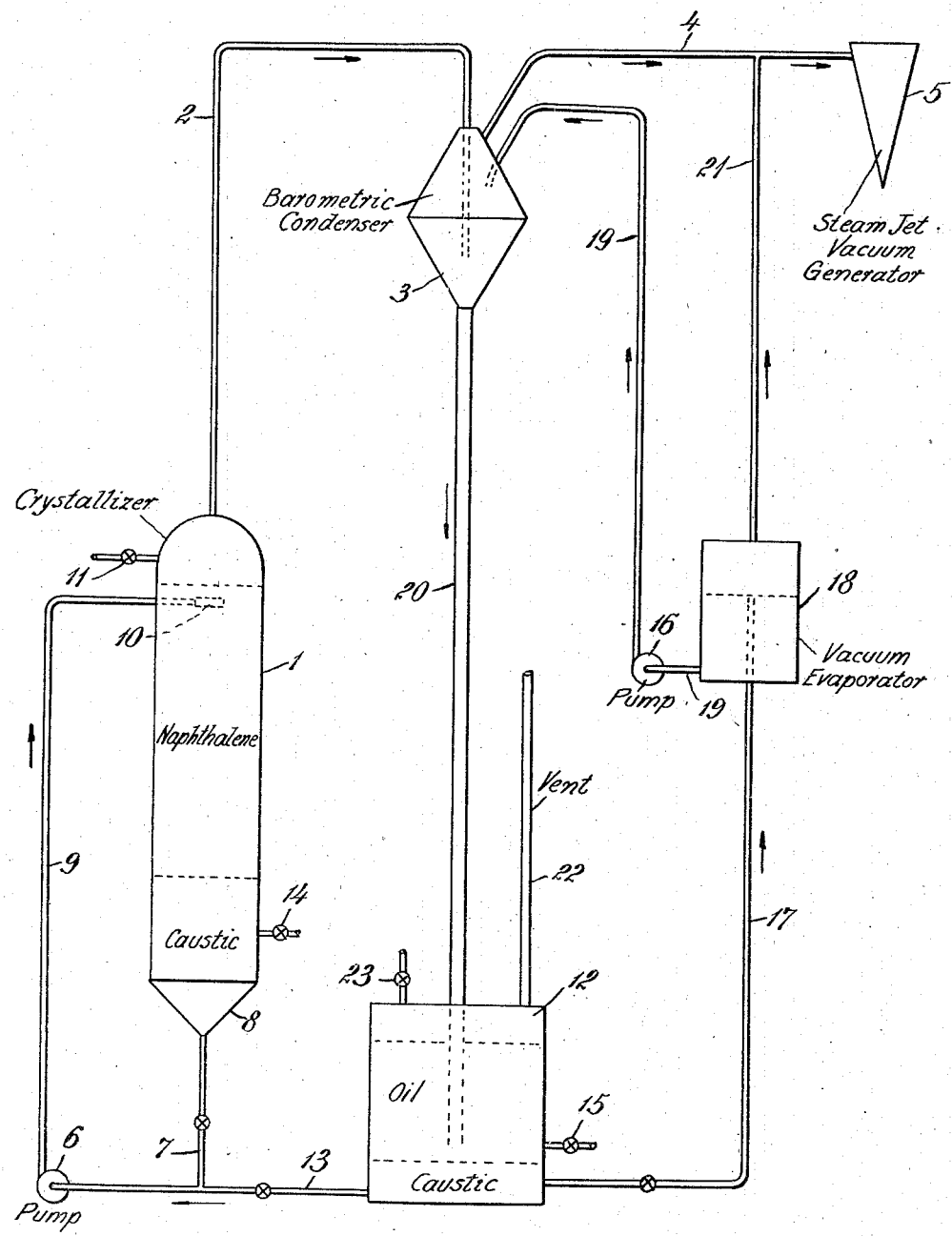

2,257,616

UNITED STATES PATENT OFFICE 2,257,616

PROCESS FOR COOLING LIQUIDS

Stuart Parmelee Miller, Scarsdale, N. Y., assignor to The Barrett Company, New York, N. Y., a corporation of New Jersey Application April 25, 1940, Serial No. 331,558

7 Claims. (Cl. 62—170)

This invention relates to the cooling of a liquid by vacuum evaporation of another liquid immiscible with the first mentioned liquid and in contact therewith, and more particularly to the crystallization of naphthalene. This application is a continuation in part of my copending application Serial No. 203,116, filed April 20, 1938, which has matured into United States Patent 2,207,752.

The successful commercial production of naphthalene refined to various degrees of purity involves the solution of a combination of problems largely specific and peculiar to such operations. These problems arise from the following conditions:

a. Large tonnage of material to be handled.
b. Close control of solidification point required in final products.
c. High degree of purity required in the more highly refined grades.
d. Difficulty of complete removal of attendant impurities.
e. Occurrence of naphthalene in different states of crystal aggregation and tendency to crystallize non-uniformly.
f. Tendency of naphthalene to form dense and heat-insulating layers of crystals on cooling coils and other cooling surfaces.

In carrying out prior processes in which crystallization of naphthalene is effected in contact with aqueous solution, it has been difficult to obtain the naphthalene product in the form of crystals which may be easily freed of liquid impurities. Thus the naphthalene tends, during crystallization to form certain amounts of crystal clusters or lumps from which the oily impurities cannot readily be removed. Likewise there are formed large numbers of individual crystals or crystal aggregates of size considerably smaller than desired; these fine crystals cause the retention by capillary attraction of unsatisfactorily large amounts of liquid hydrocarbon impurities. This lack of uniformity of size of naphthalene crystals, as exemplified by presence of lumps or clusters and of undesirably fine crystals, imposes burdens of cost and disadvantages in lowering of quality which are overcome by the process of my invention. While it is theoretically possible by careful regulation of cooling conditions and adequate agitation to obtain crystals of satisfactory size and shape intermediate the above unsatisfactory extremes, in practical plant operation this ideal condition is actually only approximated; to the extent it is not realized the cost of refined naphthalene is increased through loss of yield or necessity for reworking or both, and quality is impaired.

Furthermore, when caustic soda or other aqueous solution which it is desired to conserve is employed for the crystallization and especially when it is to be reused, it becomes necessary to remove heat from the solution by some external cooling means. In order to recover a maximum of the naphthalene product from the crude material, it is necessary to cool the solution to a temperature not far above, or even below, that of the atmosphere. While cooling to around 45° C. under usual weather conditions may be effected readily enough by ordinary heat exchange methods, the cooling problem becomes more difficult as the temperature approaches atmospheric. If only the direct addition of water or aqueous solution at about room temperature, 25° C. for instance, is depended upon to cool the mixture from a temperature of 65° C. down to 30° C., between six and seven times as much cooling solution must be added as there is mixture to be cooled. In view of the difficulties involved, among which is the large amount of cooling fluid required, it has been unfeasible in many instances, especially in warm weather, to effect sufficient cooling to recover more than 70% to 75% of the total contained naphthalene, the balance remaining dissolved in the separated hydrocarbon oil impurities.

Another difficulty encountered in circulating cooling liquid from crystallizing tanks through coolers for reuse is the formation of naphthalene deposits on coils or other cooling surfaces. These deposits result from the further cooling of oil entrained in the cooling liquid on coming in contact with the cooling surfaces; they adhere to the latter and crystallize, forming a layer of oily naphthalene crystals which reduces the cooling efficiency of the equipment and require periodic removal.

The above discussion applies to the process which is believed to represent, prior to the invention of my said copending application Serial No. 203,116, filed April 20, 1938, the most advanced practice in producing purified or refined naphthalene and which has been operated on a large scale. It has been possible to make many desired grades of refined naphthalene by careful control of operations, by some sacrifice of cost and of yield, and by including or adding sufficient purification steps of one sort or another. In the embodiments heretofore available, however, the process has had inherent defects, namely, the very extensive plant required for its operation, the investment in and maintenance of which constitute a heavy charge on the product, and the impossibility of realizing or approaching closely in practice the yields and quality of naphthalene theoretically possible.

By operating in accordance with the invention of said copending application, the formation of undesirably large crystal clusters or lumps and especially of undesirably fine naphthalene crystals or crystal aggregates is avoided, the desirable species of crystal aggregates disclosed in the Gould United States Patent No. 1,448,688 may be obtained, the temperature may without difficulty be reduced sufficiently to recover all the naphthalene practically recoverable, and the operation if desired may be carried out in one vessel with suitable auxiliaries, thereby doing away with much of the extensive equipment previously required and correspondingly reducing the necessary investment and maintenance. Since the entire crystallization and purification operation may be conducted in one piece of apparatus, thus eliminating several pieces of equipment and process steps, the opportunities for variation in control and attendant variations in yield and quality characteristic of the earlier methods may be substantially eliminated with the result that yields and quality of finished product are sharply improved and separated by-product oils are relatively free of naphthalene.

While the major commercial advantages of my process are realized in the refining and purification of naphthalene, in some cases a certain amount of benefit may be derived by using it to convert already purified naphthalene of undesirable physical form into the characteristic type and size of crystals described below, without substantial rise in solidification point.

The above results are obtained by extracting heat from a liquefied-naphthalene-aqueous-liquid mixture by evaporating a part of the liquid therefrom. The evaporation may be effected by reducing the pressure on the mixture to a sufficient extent to cause ebullition at the prevailing temperature without the application of external heat. The aqueous liquid should preferably have a vapor pressure substantially above that of the naphthalene at the temperatures involved, but this is the case with practically all aqueous solutions having a reasonable degree of dilution, and solutions used in previously known naphthalene crystallization operations may be used satisfactorily.

The proper rate of cooling may be obtained by conducting the evaporation so that the time in hours $y$ required to crystallize a weight of actual naphthalene equal to 1% of that originally present in the crude being treated is not less than $$\frac{x}{240}$$

where $x$ represents the height in feet of the initial layer of the molten crude.

The time $y$, defined in the above equation, may be increased very greatly beyond the minimum limit, $$\frac{x}{240}$$

without seriously impairing the quality of the crystals produced; good results can be obtained when $$y = \frac{x}{15}$$

and even slower rates of crystallization may be used when economically feasible. Preferably the rate should be regulated so that the time $y$ lies between $$\frac{x}{150} \text{ and } \frac{x}{90}$$

As pointed out in the said copending application, the above algebraic expression is applicable in the treatment of crude naphthalene in crystallizers of various sizes and shapes. Thus the conditions are applicable with crystallizers having a diameter as small as 5 feet and as large as 15 feet, and with naphthalene layers having a depth as little as 1 and as much as 12 or 15 feet.

My aforesaid co-pending application discloses that it is preferred to practice the process so that evaporation of the aqueous liquid occurs at or near the upper surface of the layer of molten naphthalene. This may be accomplished by admitting near the bottom of the tank a small amount of air or inert gas which agitates the charge, entraining relatively finely divided masses of aqueous solution upwards; with suitably regulated vacuum the hydrostatic pressure of the molten naphthalene prevents boiling of the mass of the aqueous solution at the bottom of the tank, but the lower pressure existing at higher levels causes evaporation of the aqueous solution. The said co-pending application also discloses that in place of the air or gas suitable mechanical agitators or pumps may be used to bring the aqueous solution, preferably in the form of droplets, to the upper surface of the naphthalene, suitable provision being made for vacuum regulation. There is also disclosed in the said application the carrying out of the process so that substantial evaporation occurs (a) in the vapor space over the naphthalene, by pumping the aqueous solution from the bottom of the tank to a nozzle or spray head located in the vapor space; (b) at an intermediate level, by pumping the aqueous solution to a nozzle or distributor head located at a desired point between the bottom and top of the naphthalene layer; or (c) at the bottom of the naphthalene layer by not circulating the aqueous solution to higher levels. The choice between modifications (a), (b) and (c) and the preferred process hereinabove described depends largely on the size and shape of the equipment used. As pointed out in the aforesaid co-pending application, experiment confirmed by commercial operation has shown that the process gives smoothest and most satisfactory operation when a tall crystallizer is used containing a relatively deep layer of molten naphthalene. This is the most compact form of apparatus and most economical of floor space.

This application is directed to the modification disclosed in said co-pending application involving a crystallizer containing a relatively deep layer or batch of molten naphthalene and involving the circulation of the caustic soda solution of a specific gravity higher than that of the molten naphthalene through the body of molten naphthalene, the caustic soda being introduced near the upper surface of the body of molten naphthalene and effecting cooling thereof by the evaporation of a part of the caustic soda solution, the remainder of the caustic soda solution settling through the body of molten naphthalene and being withdrawn near the base of the crystallizer and reintroduced at the aforesaid point near the upper surface of the body of molten naphthalene. The vacuum maintained is preferably, but not necessarily, as high as available pumping equipment will provide. Operating in this manner causes cooling of the molten naphthalene to take place from the top of the body thereof downwardly, thereby reducing the amount of oil and naphthalene volatilized within the tank. Also, caustic soda solution flowing through the body of molten naphthalene effects agitation thereof with consequent increase in the rate of cooling. Furthermore, it has been found that operation in this manner eliminates bumping which occurs when liquid masses of considerable depth are boiled under vacuum. Upon completion of the crystallization of the naphthalene, the vacuum is broken and the crystalline product is washed with a solvent if a highly purified product is desired. The crystallizer is then opened and the product removed manually or in any desired manner.

The body of naphthalene or other liquid to be cooled may be of any desired depth; preferably it is of a depth substantially greater than its diameter, if a cylindrical body is employed, or cross-sectional extent, and may be of a depth equal to its cross-sectional extent. The point of introduction of the heavier cooling liquid will, of course, vary depending on the vacuum employed, the depth of the body of lighter liquid to be cooled, the desired rate of cooling, etc. This point of introduction of the heavier liquid should be far enough below the level of lighter liquid so that under conditions of operation it does not flash off into vapor without effecting substantial cooling of the lighter liquid. As a general rule, this point of introduction of the heavier liquid is at least about six inches below the level of lighter liquid to be cooled by evaporation of a portion of the heavier liquid circulated through the lighter liquid.

In the preferred embodiment illustrated on the drawing the invention is shown in connection with a layout of apparatus for crystallizing naphthalene and the present description will be confined to this present illustrated embodiment of the invention. It will be understood, however, that the novel features and improvements are susceptible to other applications, such as, for example, as the crystallization by cooling of bodies of molten phenanthrene, diphenyl or fluorene, by circulating therethrough while maintained under vacuum solutions of caustic soda, potassium hydroxide, sodium sulfate, sodium chloride or other liquids or solutions immiscible therewith, of higher specific gravity and having a higher vapor pressure than the liquids to be cooled, and effecting evaporation of a portion of the circulated heavier liquid by introducing it continuously at a point not far below the surface of the body of liquid of lower specific gravity and permitting the liquid of higher specific gravity and vapor pressure to settle through the lighter liquid, or the cooling of such and other lighter liquids in the manner herein described by circulating a heavier liquid having a higher vapor pressure through a body of the lighter liquid maintained under vacuum. Hence, the scope of the invention is not confined to the embodiment herein described.

In the drawing, reference character 1 indicates a crystallizing tank which may be, for example, 5' in diameter, be provided with a cone bottom 30" deep, contain (measuring from the bottom of the cylindrical portion) a layer of caustic about 4' deep, a layer of molten napthalene about 12' deep, and have a vapor space of substantial extent, say, 3' above the level of the naphthalene. The crystallizer 1 communicates by means of pipeline 2 with a barometric condenser 3, which in turn communicates by means of a pipeline 4 with a steam jet vacuum generator 5. A pump 6 has its inlet 7 communicably connected with the cone bottom 8 of the crystallizer and is provided with a feed line 9 which supplies caustic soda solution withdrawn from the base of the crystallizer to a spray-head 10 disposed beneath the level of the molten naphthalene within crystallizer 1. The sprayhead 10 is preferably positioned about 6" beneath the level of the molten naphthalene which may be charged through inlet 11.

A tank 12 is disposed to receive from the barometric condenser 3 condensate and caustic soda solution circulated through the condenser. This condensate is constituted in part of oil and water evaporated in the crystallizer. The oil and caustic soda stratify in the tank 12. A portion of the lower layer of caustic soda solution may be passed through valve controlled pipe 13 by means of pump 6 to the crystallizer. Water may be added at inlet 14; oil removed at valve controlled outlet 15.

Condensation of vapor in condenser 3 is preferably effected by direct contact with caustic soda solution which is circulated by means of pump 16 through line 17, connecting the base of tank 12 with vacuum evaporator 18, and through the vacuum evaporator 18, line 19, and barometric condenser 3; the condensate formed in the condenser and caustic soda fed by pump 13 flows by gravity through the barometric leg 20 into tank 12. The circulating system 17, 18, 19, 20, through which the caustic soda solution flows is maintained under vacuum by means of line 21 communicating with pipeline 4 and thus connecting the vacuum evaporator with the steam jet vacuum generator 5.

Loss of water due to water vapor removed from the circulating system 17, 18, 19 and 20 may be compensated by the addition of water to the tank 12. Tank 12 is provided with a vent 22 and a valve controlled inlet 23.

It has long been known that too great a temperature difference between crystallizing naphthalene and cooling liquid in direct contact with it tends to produce large amounts of very small crystals and relatively large crystal aggregates that occlude mother liquor.

In the present process the temperature difference between boiling solution and adjacent naphthalene appears to be infinitesimal, and may be considered as continuously destroyed and reestablished by the crystallizing and boiling processes respectively. The rate of this transfer of heat, ultimately dependent on the boiling rate, may be regulated so as to control rate of naphthalene crystallization throughout the operation. Crystals of maximum value, i. e. more easily and completely separable from residual liquid by draining, may be obtained operating in accordance with this invention by cooling the crude, for example, one having a solidification point in the range of 55°-74° C., at such a rate that between about 10% and 15% of the total initial actual naphthalene content crystallizes out in each hour of cooling. Further, the higher the initial purity of the naphthalene, the more rapid the rate of cooling may be to yield satisfactory results; for example, with a 65° C. solidification-point naphthalene a rate of 10% per hour is preferred, but with a 73° C. solidification-point naphthalene a rate of 12% to 13% per hour is preferred.

Because of the elimination of unduly fine crystals and of undesirable crystal clusters in my process, the crystalline product may be further purified to advantage by washing it with a solvent, for example, coal-tar naphtha, petroleum naphtha, or iso-propyl alcohol. The wash liquid, in addition to being a solvent for the oily impurities, preferably is a relatively poor solvent for naphthalene and has a boiling range sufficiently different from that of naphthalene to permit easy separation by distillation. A solvent with lower boiling range than that of naphthalene is usually better for the purpose than one with higher boiling range. This washing step removes oil adhering to the crystals after the crystallization. In two crystallizations and drainings followed by coal-tar naphtha washings, I have been able without removal of naphthalene from the apparatus to convert crude naphthalene of 64° solidification point into products having solidification points as high as 79.3° C. after removal of the naphtha. This marked rise in solidification point appears due to the precise control of crystal formation, made possible by my invention with consequent efficient removal of oils and other impurities by my process and is attended by a relatively low accompanying loss of naphthalene as compared with previous processes.

Products may be made from clean commercial crudes by my process of such purity that upon evaporation in air they leave no residue and do not stain cloth materials with which they are brought into contact. As a consequence they may be used directly for such purposes as moth-proofing garments, whereas in the past the commercial naphthalene products were not suitable for this use until after they had been subjected to further treatment, as washing with sulfuric acid and subsequent sublimation (or at least to the latter step).

Water may be added to the crystallizer during the cooling, if desired, to compensate for loss by evaporation and to maintain the aqueous liquid concentration approximately constant.

One of the advantages of the present invention is the fact that it makes possible a ready and complete separation from the aqueous liquid of oily impurities removed from the naphthalene, and the recovery of such oils as a by-product. Ordinarily the oily impurities accompanying naphthalene in crude naphthalene have a specific gravity close to that of water; accordingly, gravity separation of these oils from water is difficult and time-consuming. As the aqueous liquid used in the present invention is a solution having a specific gravity substantially higher than that of water these difficulties are obviated. When it is desired to recover tar-acids directly from the naphthalene crude, as is usually the case, this solution is preferably a caustic soda solution (although caustic potash could also be used). Where it is not desired to extract tar-acids from the crude, e. g. where it is desired to produce a tar-acid oil as a by-product of the naphthalene purification, sodium sulfate or sodium chloride solutions can satisfactorily be used.

Since the temperature obtainable by vacuum evaporation may be lower than the temperature of commonly and economically available cooling liquids, I may readily and economically obtain temperatures as low as or lower than the prevailing atmospheric temperature and thus may obtain optimum yield of crystallized naphthalene. Furthermore, since heat is abstracted by evaporation within the liquid, solid cooling surfaces are done away with and the problem of preventing deposits on them is eliminated. Insulation of tank surfaces effectively prevents crystallization of naphthalene thereon. Furthermore, the practice of the process of this invention prevents bumping, which is encountered when liquid masses of considerable depth, say, over 5 feet, are boiled under vacuum. Also, it results in a substantial reduction in the loss of naphthalene, since the cooling takes place from the top of the body of molten naphthalene downwardly, resulting in the subjection of any naphthalene vapors which might tend to escape from the crystallizer to lower temperatures than would otherwise be the case, with consequent condensation thereof. Cooling in this manner has the further advantage hereinabove pointed out that it increases the rate of cooling, with consequent saving of time.

It is to be understood that this invention is not restricted to the present disclosure otherwise than as defined by the appended claims.

What is claimed is:

1. The process of cooling a body of liquid by vacuum evaporation which comprises adding to a body of substantial depth of said liquid another liquid immiscible therewith and of greater specific gravity and higher vapor pressure than the first mentioned liquid, maintaining said body under vacuum while withdrawing the liquid of greater specific gravity and higher vapor pressure therefrom and introducing it into said body to effect cooling of the body of substantial depth of the liquid of lower specific gravity by the evaporation of a portion of the liquid of greater specific gravity and higher vapor pressure.

2. The process of cooling a body of liquid of substantial depth by adding thereto a second liquid of greater specific gravity and higher vapor pressure and effecting evaporation of a portion of the said second liquid, which comprises establishing a body constituted of both of said liquids, with a body of said first-mentioned liquid of substantial depth superimposed on said second-mentioned liquid, withdrawing the liquid of greater specific gravity and higher vapor pressure and recirculating it through said upper body by introducing it near but below the top of said upper body and causing it to settle through said upper body while subjecting said body to vacuum.

3. The process of cooling a liquid by adding thereto a second liquid of greater specific gravity and higher vapor pressure and effecting evaporation of a portion of the said second liquid, which comprises establishing a body constituted of both of said liquids of a cross-sectional extent at least about 5 feet and a depth at least equal to the cross-sectional extent of said body, maintaining said body under vacuum, continuously withdrawing from the lower portion of said body the liquid of greater specific gravity and higher vapor pressure and recirculating it through said body by continuously introducing the said portion thus withdrawn at a point not less than about 6 inches below the top of said body, causing evaporation of a portion of said liquid of greater specific gravity to take place and thus cool the first mentioned liquid, and causing the unevaporated portion of said liquid of greater specific gravity to settle through said body.

4. The process of crystallizing a substance from the group consisting of phenanthrene, diphenyl, naphthalene and fluorene, which comprises establishing a body of the said substance in liquid condition of substantial depth, maintaining said body under vacuum while introducing near but below the top of said body a liquid of a specific gravity greater than that of said substance and immiscible therewith, causing evaporation of a portion of said liquid of greater specific gravity to take place so as to cool the body of said substance to effect crystallization thereof, causing the remainder of said liquid of greater specific gravity to settle through the body of said substance and collect beneath the said body, withdrawing the liquid of greater specific gravity thus collected and continuously recirculating it through the said body until crystallization of substantially the entire content of said substance in said body has taken place.

5. The process of crystallizing a substance from the group consisting of phenanthrene, diphenyl, naphthalene and fluorene, which comprises establishing a body of said substance of a cross-sectional extent at least equal to 5 feet and of a depth substantially greater than the cross-sectional extent, maintaining said body under vacuum, introducing near but below the top of said body a solution of material from the group consisting of caustic soda, potassium hydroxide, sodium sulfate and sodium chloride, of a specific gravity greater than that of said substance, causing evaporation of a portion of the liquid of greater specific gravity to take place so as to cool the said body to effect crystallization of the said substance, causing the remainder of the said liquid of greater specific gravity to settle through the said body and to collect beneath the said body, withdrawing the liquid of greater specific gravity thus collected and continuously recirculating it through the said body until crystallization of substantially the entire content of said substance in said body has taken place.

6. The process of crystallizing naphthalene which comprises establishing a body of molten naphthalene of a cross-sectional extent at least equal to 5 feet and of a depth substantially exceeding its cross-sectional extent, maintaining said body under vacuum, introducing at about 6 inches below the top of said body a caustic soda solution of a specific gravity greater than that of the naphthalene, causing evaporation of a portion of the caustic soda solution to take place so as to cool the body of naphthalene to effect crystallization thereof, causing the remainder of said caustic soda solution to settle through the body of molten naphthalene and to collect beneath the said body of naphthalene, withdrawing the caustic soda solution thus collected and continuously recirculating it through said body of molten naphthalene by introducing it at the said point near but below the top of the body of molten naphthalene, causing a portion thereof to evaporate to effect cooling of the naphthalene and the remainder to settle through the body of molten naphthalene, until crystallization of substantially the entire naphthalene content of said body has taken place.

7. The process of crystallizing naphthalene which comprises establishing a body of molten naphthalene of substantial depth, maintaining said body under vacuum while introducing near but below the top of said body of molten naphthalene a caustic soda solution of a specific gravity greater than that of the naphthalene, causing evaporation of a portion of the caustic soda solution to take place so as to cool the body of naphthalene to effect crystallization thereof, causing the remainder of said caustic soda solution to settle through the body of molten naphthalene and to collect beneath the said body of naphthalene, withdrawing caustic soda solution thus collected and continuously recirculating it through the said body of molten naphthalene until crystallization of substantially the entire naphthalene content of said body has taken place, and adding water to the body of caustic soda solution beneath the said body of naphthalene to replace that lost by evaporation.

STUART P. MILLER.